US006547887B1

(12) United States Patent
Ko et al.

(10) Patent No.: US 6,547,887 B1
(45) Date of Patent: Apr. 15, 2003

(54) MULTILAYER PRESSURE-SENSITIVE ADHESIVE LABEL CONSTRUCTIONS

(75) Inventors: Chan U. Ko, Arcadia, CA (US); Luigi Sartor, Pasadena, CA (US); Carol A. Koch, San Gabriel, CA (US); Paul Keller, Gottlieben (CH); Ian Brown, Leiderdorp (NL); Kyung W. Min, Mentor, OH (US); Li Xie, Painesville, OH (US); Prakash Mallya, Sierra Madre, CA (US); Kai Li, Diamond Bar, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/464,657

(22) Filed: Dec. 15, 1999

Related U.S. Application Data

(60) Provisional application No. 60/112,521, filed on Dec. 15, 1998.

(51) Int. Cl.$^7$ ................................................. B08B 7/00
(52) U.S. Cl. ........................... 134/6; 134/15; 134/16; 134/26; 428/343; 428/354; 428/355; 428/356; 524/270; 524/272; 524/395
(58) Field of Search .................. 524/270, 272, 524/395; 428/354, 356, 355, 343; 164/6

(56) References Cited

U.S. PATENT DOCUMENTS

| | | | |
|---|---|---|---|
| 3,096,202 A | 7/1963 | deGroot von Arx | 117/68.5 |
| 3,464,842 A | 9/1969 | Jackstadt | 117/44 |
| 4,112,177 A | 9/1978 | Salditt et al. | 428/304 |
| 4,151,319 A | 4/1979 | Sackoff et al. | 428/40 |
| 4,199,645 A | 4/1980 | Schwarz | 428/339 |

(List continued on next page.)

FOREIGN PATENT DOCUMENTS

| | | |
|---|---|---|
| JP | 56053166 | 5/1981 |
| JP | 6001958 | 1/1994 |
| JP | 7003218 | 1/1995 |
| TW | 95108143 | 8/1995 |
| TW | 95108145 | 8/1995 |
| WO | 88/03477 | 5/1988 |
| WO | 91/18739 | 12/1991 |
| WO | 93/08239 | 4/1993 |
| WO | 94/03550 | 2/1994 |
| WO | 95/14746 | 6/1995 |
| WO | 96/08230 | 3/1996 |
| WO | 96/08367 | 3/1996 |
| WO | 96 08369 | 3/1996 |
| WO | 96 08539 | 3/1996 |
| WO | 97/33748 | 9/1997 |
| WO | 98/44064 | 10/1998 |
| WO | 00/36042 | 6/2000 |

*Primary Examiner*—Randy Gulakowski
*Assistant Examiner*—Gentle Winter
(74) *Attorney, Agent, or Firm*—Christie, Parker & Hale, LLP

(57) ABSTRACT

Multilayer PSA label constructions that achieve a good balance of properties, namely, adhesive performance, convertibility, and laser printer performance, and, optionally, good wet-out on plastic substrates and low haze. The multilayer PSA construction comprising a facestock, a multilayer adhesive coating, and a release liner. The adhesive coating is made of a face side adhesive (FSA) layer comprising a first emulsion acrylic PSA, which is in contact with the inner surface of the facestock, and a liner side adhesive (LSA) layer, comprising a second emulsion acrylic PSA different from the first acrylic PSA, which is in contact with the FSA. The adhesive coating has a coat weight of less than about 26 g/m$^2$ and a flow of less than about 50 µm at room temperature. The construction exhibits a loop tack value of at least about 3.5 N/25 mm at 5° C. on a polyethylene substrate. It has been discovered that multilayer PSA label constructions exhibiting these properties also exhibit good convertibility and laser printer performance.

45 Claims, 8 Drawing Sheets

(1 of 8 Drawing Sheet(s) Filed in Color)

U.S. PATENT DOCUMENTS

| | | | |
|---|---|---|---|
| 4,260,659 A | 4/1981 | Gobran | 428/217 |
| 4,262,058 A | 4/1981 | Saunders | 428/537 |
| 4,335,171 A | 6/1982 | Zenk | 428/40 |
| 4,374,883 A | 2/1983 | Winslow | 428/40 |
| 4,543,139 A | 9/1985 | Freedman et al. | 156/152 |
| 4,581,281 A | 4/1986 | Gerace | 428/215 |
| 4,619,851 A | 10/1986 | Sasaki et al. | 428/40 |
| 4,894,259 A | 1/1990 | Kuller | 427/208.8 |
| 4,935,288 A | 6/1990 | Honaker et al. | 428/207 |
| 4,992,501 A | 2/1991 | Hanninen et al. | 524/272 |
| 5,154,956 A | 10/1992 | Fradrich | 428/40 |
| 5,189,126 A | 2/1993 | Bernard | 526/261 |
| 5,196,504 A | 3/1993 | Scholz et al. | 526/318.4 |
| 5,221,706 A | 6/1993 | Lee et al. | 524/156 |
| 5,264,532 A | 11/1993 | Bernard | 526/261 |
| 5,326,644 A | 7/1994 | Scholz et al. | 428/514 |
| 5,380,779 A | 1/1995 | D'Haese | 524/272 |
| 5,470,563 A | 11/1995 | Tanaka et al. | 424/448 |
| 5,492,950 A | 2/1996 | Brown et al. | 524/166 |
| 5,558,913 A | 9/1996 | Sasaki et al. | 428/41.5 |
| 5,593,759 A | 1/1997 | Vargas et al. | 428/200 |
| 5,623,011 A | 4/1997 | Bernard | 524/270 |
| 5,648,167 A | 7/1997 | Peck | 428/355 AC |
| 5,700,535 A | 12/1997 | Galsterer et al. | 428/40.1 |
| 5,718,958 A | 2/1998 | Scholz et al. | 428/40.1 |
| 5,728,430 A | 3/1998 | Sartor et al. | 427/356 |
| 5,738,939 A | 4/1998 | Calhoun et al. | 428/343 |
| 5,827,609 A | 10/1998 | Ercillo et al. | 428/354 |
| 6,183,862 B1 * | 2/2002 | Ko et al. | 428/354 |

* cited by examiner

MULTILAYER PRESSURE-SENSITIVE ADHESIVE LABEL CONSTRUCTIONS

CROSS-REFERENCE TO RELATED APPLICATION

This application claims priority of U.S. Provisional Patent Application No. 60/112,521, filed Dec. 15, 1998, the entire disclosure of which is incorporated herein by reference.

FIELD OF INVENTION

The present invention relates to multilayer pressure-sensitive adhesive (PSA) constructions that exhibit a balance of high adhesive performance (including low temperature performance), good convertibility, improved wet-out on plastic substrates, improved haze and low contaminant build-up in printers for paper and film applications.

BACKGROUND OF THE INVENTION

PSAs and self-adhesive labels are now used extensively in the home, in offices and in many commercial settings. In a typical construction, a removable release liner is coated with a PSA, which is laminated to a label facestock—typically an imprintable paper or plastic film. Removal of the release liner allows the label to be adhered to a substrate. Alternatively, the PSA can be directly coated onto the facestock. Such constructions are typically produced in large (e.g., 79" wide) rolls, which are then slit into smaller (e.g., 11" wide) rolls. Label sheets are made by cutting the resulting rolls into sheets, for example, 8½"×11 sheet, A4 sheets or 5"×8" sheets. Individual labels are fabricated by die-cutting the construction before the sheeting step, and, optionally, the label sheet is matrix-stripped. In contrast, tapes usually do not require die-cutting and sheeting. Labels are also typically capable of being machine-printed, while tapes are typically not printed.

The adhesives used in PSA labels and tapes include rubber-based polymers (usually tackified with one or more tackifiers that improve overall adhesion to various substrates), and acrylic polymers (which may be inherently tacky or are compounded with a tackifier). PSAs can be applied to a release liner or facestock from an organic solvent, from an aqueous dispersion, or as a hot melt.

A good PSA label should exhibit a number of desirable properties, including, for example, sufficient shear, peel adhesion, tack, and quickstick, to a variety of substrates, and at various temperatures. In other words, the labels should exhibit sufficiently high adhesion to the substrate(s) on which they are to be used over a range of temperatures. However, PSAs that exhibit sufficiently high adhesion, particularly at low temperatures, generally tend to exhibit high flow. As a result, such PSAs tend to exhibit relatively low convertibility; they tend to ooze from the edges of the construction during converting. The ideal PSA label would not only perform well on a variety of substrates at various temperatures, but would also convert well.

The cost of converting an adhesive laminate into a finished product is a function of the speed and efficiency at which it undergoes converting operations, including die-cutting and matrix-stripping to leave labels on a release liner, butt-cutting of labels to the release liner, marginal hole punching, perforating, fan folding, guillotining and the like, and optionally printing. Die-cutting involves cutting of the laminate to the surface of the release liner. Hole punching, perforating and guillotining involve cutting cleanly through the label laminate. While the nature of all layers of the laminate can impact the ease and cost of convertibility, the adhesive layer typically has been the greatest limiting factor in each type of converting operation. This is due to the viscoelastic nature of the adhesive, which hampers precise and clean penetration of a die in die-cutting operations and promotes adherence to die-cutting blades and the like in cutting operations. Stringiness of the adhesive may also impact matrix-stripping operations, which typically follow die-cutting operations. Thus, it is desirable to balance adhesive performance with convertibility.

Printing is an optional step during label converting. In the case of unprinted labels, such as office and personal computer labels, printing occurs during use of the labels. A desirable property of office and computer labels for laser printers is high laser printer performance, i.e., reduced contaminant build-up in a laser printer when a large number of label sheets are run through the printer. Unfortunately, many PSA label sheets, when passed through the laser printer, leave a residue containing PSA on the photoreceptor roll, fuser bar, roller and/or other parts of the printer. Printer performance, like convertibility, is generally a function of the flowability of the adhesive.

Another desirable property of some PSAs is good wet-out on plastic substrates. However, this property, like adhesion, generally increases with adhesive flowability. Thus, as wet-out on plastic substrates is improved, convertibility is sacrificed.

Still another desirable property for some applications is adhesive clarity. Many adhesive labels are designed to be clear, for example, where they will be applied to clear bottles. The adhesive used in such labels, when applied to a rough surface, should be clear, i.e., not hazy, so that the adhesive is not visible through the clear facestock of the label. This property is related to wet-out in the case of clear film or plastic labels for plastic substrates, in that poor wet-out tends to cause loss of clarity during application of such labels.

Thus, a need exists for a PSA label construction that achieves a good balance of the above-described properties, particularly adhesive performance, convertibility, and laser printer performance.

SUMMARY OF THE INVENTION

According to the present invention, there are provided multilayer PSA label constructions that achieve a good balance of properties, namely, adhesive performance, convertibility, and laser printer performance, and, optionally, good wet-out on plastic substrates and low haze. In one embodiment, the invention is directed to a multilayer PSA construction comprising a paper or film facestock, a multilayer adhesive coating, and a release liner. The adhesive coating is made of a face side adhesive (FSA) layer comprising a first emulsion acrylic PSA, which is in contact with the inner surface of the facestock, and a liner side adhesive (LSA) layer, comprising a second emulsion acrylic PSA different from the first acrylic PSA, which is in contact with the FSA. The adhesive coating has a coat weight of less than about 26 g/m² and a flow of less than about 50 microns ($\mu$m) at room temperature. The construction exhibits a loop tack value of at least about 3.5 N/25 mm at 5° C. on a polyethylene substrate, particularly when the facestock is 50 lb uncoated, wood-free, sized 2-sides label stock. It has been discovered that multilayer PSA label constructions exhibiting these properties also exhibit good convertibility and laser printer performance.

In another embodiment, the invention is directed to a method for minimizing contaminant build-up in a printer caused by extended printing of adhesive labels. The method comprises repeatedly passing through the printer a PSA label sheet comprising a paper or film facestock, a multilayer adhesive coating and a release liner. The adhesive coating is made of an FSA layer comprising a first acrylic PSA in contact with the inner surface of the facestock, and an LSA layer comprising a second acrylic PSA, which is different from the first acrylic PSA, in contact with the FSA.

In yet another embodiment, the invention is directed to a multilayer PSA label construction exhibiting good printer performance and good adhesive performance. The PSA label comprises a facestock, an FSA layer in contact with the facestock, an LSA layer in contact with the FSA layer, and a release liner in contact with the LSA layer. The FSA layer comprises a first acrylic PSA, and the LSA layer comprises a second acrylic PSA different from the first acrylic PSA. The construction, particularly when made with a 50 lb uncoated, wood-free, sized 2-sides label stock, exhibits (i) a loop tack value of at least about 3.5 N/25 mm at 5° C. on a polyethylene substrate, and (ii) good printer performance, i.e., reduced contaminant build-up in a laser printer when a large number of label sheets are run through the printer, as demonstrated by a defect area of less than 50 mm2 on a black-out sheet that was passed through a laser printer through which at least about 2500 sheets of the construction have been fed.

In still another embodiment, the invention is directed to a multilayer PSA label construction exhibiting a good balance of adhesive performance, convertibility, and laser printer performance. The multilayer PSA label construction comprises a facestock, an FSA layer in contact with the facestock, an LSA layer in contact with the FSA layer, and a release liner in contact with the LSA layer. The FSA layer comprises a first acrylic PSA, and the LSA layer comprises a second acrylic PSA, different from the first acrylic PSA. The first acrylic PSA exhibits a flow of less than about 40 $\mu$m. The second acrylic PSA is selected based on its low temperature adhesive performance. The second acrylic PSA exhibits a loop tack value at 5° C. on polyethylene of at least about 3.75 N/25 mm, particularly when part of a construction comprising a 50 lb uncoated, wood-free, sized 2-sides label stock.

In another embodiment, the invention is directed to a multilayer PSA label construction comprising a paper or film facestock, an FSA layer in contact with the facestock, an LSA layer in contact with the FSA layer, and a release liner in contact with the LSA layer. The FSA layer comprises a first acrylic PSA, and the LSA layer comprises a second acrylic PSA different from the first acrylic PSA. The construction, particularly when made with 50 lb uncoated, wood-free, sized 2-sides label stock, exhibits a loop tack value of at least about 3.5 N/25 mm at 5° C. on a polyethylene substrate. The FSA and LSA, when taken together, exhibit a haze value of less than about 60%. The label constructions of this embodiment are particularly useful for use as clear labels when used with a clear film facestock. They exhibit a balance of good adhesive performance and good clarity.

Another embodiment of the invention is directed to a multilayer PSA label construction that exhibits good convertibility and good adhesive performance. The multilayer PSA construction comprises a film or paper facestock, an FSA layer in contact with the facestock, an LSA layer in contact with the FSA layer, and a release liner in contact with the LSA layer. The FSA layer comprises a first acrylic PSA, and the LSA layer comprises a second acrylic PSA different from the first acrylic PSA. The FSA layer and LSA layer, when part of the construction, have a combined specified thickness. The multilayer construction, when cut by a slitting knife in a converting operation, exhibits less contaminant build-up on the slitting knife than a comparable adhesive construction comprising a single layer of the LSA applied in an amount such that the single layer has the specified thickness. Preferably, the multilayer construction, particularly when made with 50 lb uncoated, wood-free, sized 2-sides label stock, exhibits a loop tack value of at least about 3.5 N/25 nm at 5° C. on a polyethylene substrate.

Another embodiment of the invention is directed to a multilayer PSA label construction that exhibits good convertibility with respect to matrix-stripping. The multilayer PSA construction comprises a film or paper facestock, an FSA layer in contact with the facestock, an LSA layer in contact with the FSA layer, and a release liner in contact with the LSA layer. The multilayer construction, when cut by a matrix-stripping die, exhibits less adhesive build-up on the die than a comparable adhesive construction having a single layer of the LSA PSA applied in an amount such that the single layer has the specified thickness.

The invention is further directed to a method of producing a multilayer PSA adhesive construction, and to a method of producing unprinted label sheets for use with laser printers based upon such multilayer PSA construction. The multilayer PSA construction comprises a paper or film facestock, a multilayer adhesive coating and a release liner. The adhesive coating is made of an FSA layer comprising a first acrylic PSA in contact with the inner surface of the facestock, and an LSA layer comprising a second acrylic PSA, which is different from the first acrylic PSA, in contact with the FSA. The method comprises providing a release liner and a facestock that is suitable for machine-printing. A first emulsion acrylic adhesive layer (the LSA) is applied to an inner surface of the release liner. A second emulsion acrylic adhesive layer (the FSA) is applied to the first acrylic adhesive layer. The facestock is applied to the second emulsion acrylic adhesive layer to form an adhesive construction. The adhesive construction is cut to form unprinted labels on the release liner. Such labels have the property of minimizing contaminant build-up in a printer caused by extended printing of adhesive labels, measured by repeatedly passing through the printer PSA label sheets produced by this method. In a preferred embodiment, the LSA and FSA are applied simultaneously, such as by a multilayer coating die.

DESCRIPTION OF THE DRAWINGS

These and other features and advantages of the present invention will be better understood by reference to the following detailed description when considered in conjunction with the accompanying drawings. The file of this patent application contains at least one photograph executed in color. Copies of this patent with the color photograph(s) will be provided by the Patent and Trademark Office upon request and payment of the necessary fee.

DETAILED DESCRIPTION

According to the invention, there are provided multilayer pressure-sensitive adhesive (PSA) constructions that exhibit a balance of high adhesive performance (including low temperature performance), good convertibility, improved wet-out on plastic substrates, improved haze and low contaminant build-up in printers for paper and film applications.

Figure 1:
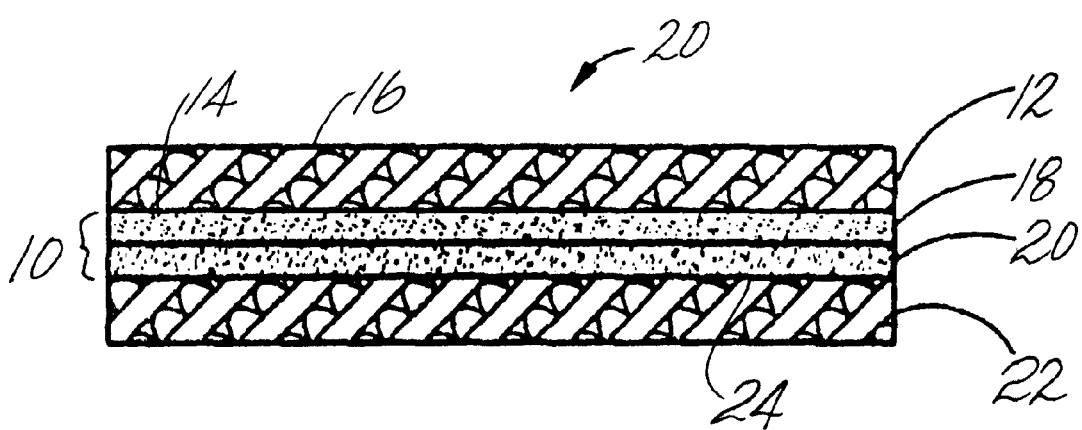
FIG. 1 is a schematic, cross-sectional illustration of one embodiment of a multilayer adhesive construction according to the invention, showing a facestock, adhesive coating with two adhesive layers, and a release liner.

As shown in FIG. 1, the multilayer PSA construction comprises a multilayer adhesive coating 10 adhered to a facestock 12. The facestock 12 has an inner surface 14 and an outer surface 16. The adhesive coating 10 comprises a face side adhesive (FSA) 18 and a liner side adhesive (LSA) 20. The FSA 18 is in contact with the inner surface of the facestock 12. The LSA 20 is in contact with the FSA 18. The adhesive coating 10 is protected until application by an end-user consumer by a release liner 22 having a release surface 24.

The facestock 12 can be any flexible material commonly used in tapes and labels, including film and paper, such as Kraft, bond, offset, litho paper, and sulfite paper, with or without a sizing or other surface treatment; polyolefins, such as polyethylene, polypropylene, polyethylene terephthalate and ethylene-propylene copolymers; and other materials commonly used in the art. For laser label applications, particularly preferred paper facestocks are laser-imprintable paper facestocks having sufficient layflat and tonor anchorage, such as uncoated papers (e.g., bond, vellum, ledger, more preferably of 40 to 60 lbs. per 25 inch×38 inch×500 ream size, C1S papers (e.g., matte, semigloss, satin, fluorescent, and dull), more preferably of 40 to 60 lbs. per 25 inch×38 inch×500 ream size, cast coated stocks (50 to 60 lb.), and latex-impregnated coated and uncoated papers. Particularly preferred film facestocks for laser label applications are laser-imprintable film facestocks having sufficient heat stability and varnish receptive or toner anchorage. Examples of preferred film facestocks include clear vinyls and polyesters of about 2 to 4 mils, pigment-filled vinyls and polyesters for colors of about 2 to 6 mils, metallized polyesters on backside of about 2 to 4 mils, and two-side polyethylene-coated kraft paper of about 5 mils.

The inner surface 14 (sometimes called an under surface) of the facestock 12 is optionally coated with a barrier layer (not shown), other than the barrier created by the adhesive coating of the invention, to prevent migration of constituents from the adhesive coating 10 into the facestock 12. The adhesion of the adhesive coating 10 to the facestock 12 can be enhanced by corona-treating the facestock or treating the facestock with a tie or primer layer (not shown). Optionally, additional adhesive layers can be included in the inventive multilayer constructions.

The total thickness (coat weight) of the adhesive coating 10 affects the convertibility of the construction. Generally, as the thickness of the adhesive coating is increased, edge ooze is increased and, as a result, more adhesive tends to build-up on the knives during converting. In a similar manner, the thickness of the adhesive coating affects printer performance. Accordingly, it has been found that the coat weight of the total adhesive coating 10 is preferably less than about 26 g/m$^2$ (grams per square meter), more preferably from about 8 to 26 g/m$^2$. Still more preferably, the total coat weight of the adhesive coating is from about 16 to 20 g/m$^2$, and even more preferably from about 17 to 19 g/m$^2$. In FIG. 1, the thickness of each layer of the adhesive coating 10 is exaggerated to aid the reader, and the relative thicknesses of the layers are not to scale.

Preferably the thickness of the FSA layer is greater than or equal to the thickness of the LSA layer, and more preferably the FSA layer is at least twice as thick as the LSA layer. More specifically, the coat weight of the FSA layer preferably ranges from about 6 to 16 g/m$^2$, and more preferably from about 10 to 14 g/m$^2$. The coat weight of the LSA layer preferably ranges from about 2 to 10 g/m$^2$, and more preferably from about 5 to 7 g/m$^2$.

The LSA and FSA each comprise a PSA. The LSA and FSA are selected so that the total applied PSA coating has a flow of less than about 50 $\mu$m at room temperature, measured as described in the section of the Examples entitled "Adhesive Flow", and so that the construction exhibits a loop tack value of at least about 3.5 N/25 mm at 5° C. on a polyethylene substrate, measured as described in the section of the Examples entitled "5° C. Loop Tack". In a particularly preferred embodiment, the the multilayer adhesive coating is selected such that the construction, when the facestock is 50 lb uncoated, wood-free, sized 2-sides label stock, exhibits a loop tack value of at least about 3.5 N/25 mm at 5° C. on a polyethylene substrate. It should be understood that the PSA construction of the invention is not limited to facestocks of 50 lb uncoated, wood-free, sized 2-sides label stock. However, in a preferred embodiment, loop tack is measured by combining the FSA and LSA of the PSA construction with this facestock, regardless of the facestock material used in the construction.

The flow of the adhesive coating affects the convertibility of the construction. As the flow of the adhesive coating increases, the tendency for edge ooze also increases, resulting in increased adhesive build-up during converting. For this same reason, increased flow also results in decreased printer performance. Accordingly, the adhesive coating preferably has a flow ranging from about 20 to 50 $\mu$m, more preferably less than about 45 $\mu$m, and still more preferably less than about 40 $\mu$m. Preferably the construction exhibits a loop tack value of at least about 3.5 N/25 mm, more preferably at least about 4.0 N/25 mm, and still more preferably at least about 6.0 N/25 mm, at 5° C. on a polyethylene substrate. Test methods used to measure adhesive flow and loop tack values are described in detail in the Examples section of this application.

Suitable FSAs are PSAs that adhere to the facestock and convert well. PSAs that convert well tend to be generally more rigid and brittle than their high adhesion performance counterparts. PSAs for the FSA layer can therefore be selected based on their flow characteristics. In particular, the FSAs should exhibit a relatively low adhesive flow value, i.e., less than about 40 µm, preferably less than 30 µm, and more preferably less than 20 µm. Suitable LSAs are selected based on their adhesive performance, including low temperature (5° C.) adhesive performance. For example, a suitable LSA, particularly when part of a construction comprising a 50 lb uncoated, wood-free sized 2-sides label stock, exhibits a loop tack value of at least about 3.75 N/25 mm, preferably about 7.5 N/25 mm, at 5° C. on a polyethylene substrate. The LSA preferably has a glass transition temperature ($T_g$) of about 10° to −30° C.

Preferably the adhesive coating has a haze value of less than about 60% at room temperature, more preferably less than about 45% at room temperature, as measured as described in the Examples section under the heading "Haze".

Preferably the LSA and FSA each comprise an acrylic PSA polymer, more preferably an emulsion acrylic PSA polymer. The acrylic PSA polymer can be inherently tacky or compounded with an external tackifier, such as a hydrocarbon resin, a rosin, or rosin derivative, or other tackifier commonly used in the manufacture of PSAs. Acrylic PSA polymers (more precisely, copolymers) are prepared using standard polymerization techniques, for example, free radical polymerization. Emulsion polymerization is preferred, but the reaction can also be run as a solvent polymerization, a bulk or hot melt polymerization, a radiation-induced polymerization on web, etc. In a preferred embodiment, an acrylic emulsion PSA is prepared by allowing the monomers to react in the presence of suitable polymerization initiators and emulsifiers (surfactants). In some embodiments, one or more activators and chain transfer agents (or other molecular weight regulators) are also employed in the reaction.

Suitable polymerization initiators include, but are not limited to, persulfates, such as sodium persulfate ($Na_2S_2O_8$), potassium persulfate, and peroxy persulfates; and peroxides, such as tert-butyl hydroperoxide (t-BHP); used alone or in combination with one or more reducing components or activators, such as bisulfites, metabisulfites, ascorbic acid, erythorbic acid, sodium formaldehyde sulfoxylate, ferrous sulfate, ferrous ammonium sulfate, etc. The activator is believed to form a redox couple with the initiator, and promotes faster generation of free radicals.

Enough initiator is used to promote free-radical polymerization of the monomers. A small amount of base, e.g., ammonium hydroxide, sodium hydroxide, sodium bicarbonate, etc., can be added to the initiator to stabilize the emulsion polymerization.

Non-limiting examples of emulsifiers include both anionic and nonionic surfactants and stabilizers, including without limitation, alkyl phenol ethoxylates, such as nonylphenol ethoxylate (a nonionic surfactant sold as POLYSTEP F9 by Stepan Company Inc. of Winnetka, Ill.), alkylaryl sulfonates, such as sodium dodecylbenzene sulfonate (an anionic surfactant sold as Rhodacal DS10 by Rhodia, of Cranbury, N.J.), and Rhodacal A246L (an alpha olefin sulfonate available from Rhodia), Disponil FES77, a sodium lauryl ether sulfate surfactant, available from Henkel of America, Inc. (King of Prussia, Pa.); TSPP (sodium pyrophosphate), available from J. T. Baker (Mallinckrodt Baker, Inc., Phillipsburg, N.J.); and Aerosol OT-75, a sodium dioctyl sulfosuccinate surfactant, available from American Cyanamid (Wayne, N.J.). Other nonlimiting examples of useful surfactants include cetyl trimethyl ammonium bromide, available from Aldrich (Milwaukee, Wis.); AR-150, a nonionic, ethoxylated rosin acid emulsifier available from Hercules, Inc. (Wilmington, Del.); Alipal CO-436, a sulfated nonylphenol ethoxylate available from Rhodia; Trem LF40, a sodium alkyl allyl sulfosuccinate surfactant, available from Henkel of America, Inc.; Polystep B-27, a sodium nonylphenol ethoxylated sulfate, available from Stepan Company, Inc. (Winnetka, Ill.); and disodium ethoxylated alkyl alcohol half esters of sulfosuccinic acid, described in U.S. Pat. No. 5,221,706 (incorporated by reference herein), and available from VWR Scientific Corp., Sargent-Welch Division (Westchester, Pa.). Other surfactants include the Triton X-series of surfactants made by Union Carbide (Danbury, Conn.). In general, one probably would not employ both a cationic and an anionic surfactant in the same polymerization reaction. Anionic plus nonionic surfactant combinations, however, are readily used to prepare the emulsion copolymers described herein. The emulsifiers are employed in an amount sufficient to form stable monomer emulsions.

While actual production techniques may vary depending upon particular monomer compositions, available equipment, and other considerations, in general, the emulsion polymers are prepared by first mixing one or more pre-emulsions containing conventional surfactants, sodium bicarbonate, and some or all of the monomers in deionized water; adding reactive surfactants (if any) and other reactor ingredients (e.g., Fe-EDTA, AR 150, hydrogen peroxide) to a nitrogen-purged reactor; heating the reactor to 70° C.±2° C. and then adding a pre-emulsion charge over time (preferably in stepped or mixed feed sequences); adding an initiator charge containing, for example, potassium persulfate; continuing the pre-emulsion feeds and addition of any accelerators; adding any post-reaction charges (e.g., t-BHP, ascorbic acid, and more water); cooling the reactor contents to below 35° C.; and filtering the emulsion polymer. Before filtering the reaction mixture, a biocide, for example, Kathon LX (available as a 1.5% solution from Rohm & Haas, Philadelphia, Pa.), can be added to prevent bacterial growth.

In some embodiments, the copolymers are prepared by sequential polymerization and the monomers are allowed to react in distinct stages. Methods for the sequential polymerization of emulsion acrylic PSAs are disclosed, for example, in U.S. patent application Ser. Nos. 08/829,002, filed Mar. 31, 1997, and 09/037,589, filed Mar. 9, 1998, the disclosures of which are incorporated herein by reference.

The adhesive layers of the present invention may be coated onto facestock or release liners by any means known to those of skill in the art. For example, it is contemplated that adhesive layers 18 and 20, as shown in FIG. 1, may be applied by solvent coating or emulsion coating at one or more coating stations. Adhesive layers 18 and 20 might also be coated to different substrates, and then be laminated together to form an integral product. Other known methods of simultaneous coating include slide coating, multilayer die coating, and die/slide combination coating.

The label sheets according to the invention can be prepared by any method known to those skilled in the art. According to one preferred method, the LSA is applied to the release liner, while the FSA is simultaneously applied over the LSA. Once the adhesives have dried, the facestock is applied to the FSA to form a multilayer adhesive construction. Alternatively, the LSA and FSA can be applied sequentially rather than simultaneously. In another alternative method, the LSA can be applied to the release liner and the FSA applied to the facestock, and then the layers are laminated together to form a multilayer adhesive construction. In yet another alternative, the LSA can be applied to the release liner to form a first construction. A second construction comprising a facestock, the FSA and a release liner is provided. The release liner is removed from the second construction, which is married with the first construction to obtain a multilayer adhesive construction. Regardless of how the multilayer adhesive construction is prepared, the adhesive construction is then cut, such as by die-cutting or butt cutting, to form unprinted labels on the release liner. Preferably the label sheet is also matrix-stripped, for example, as described in U.S. Pat. No. 5,700,535, the disclosure of which is incorporated herein by reference.

Figure 6:
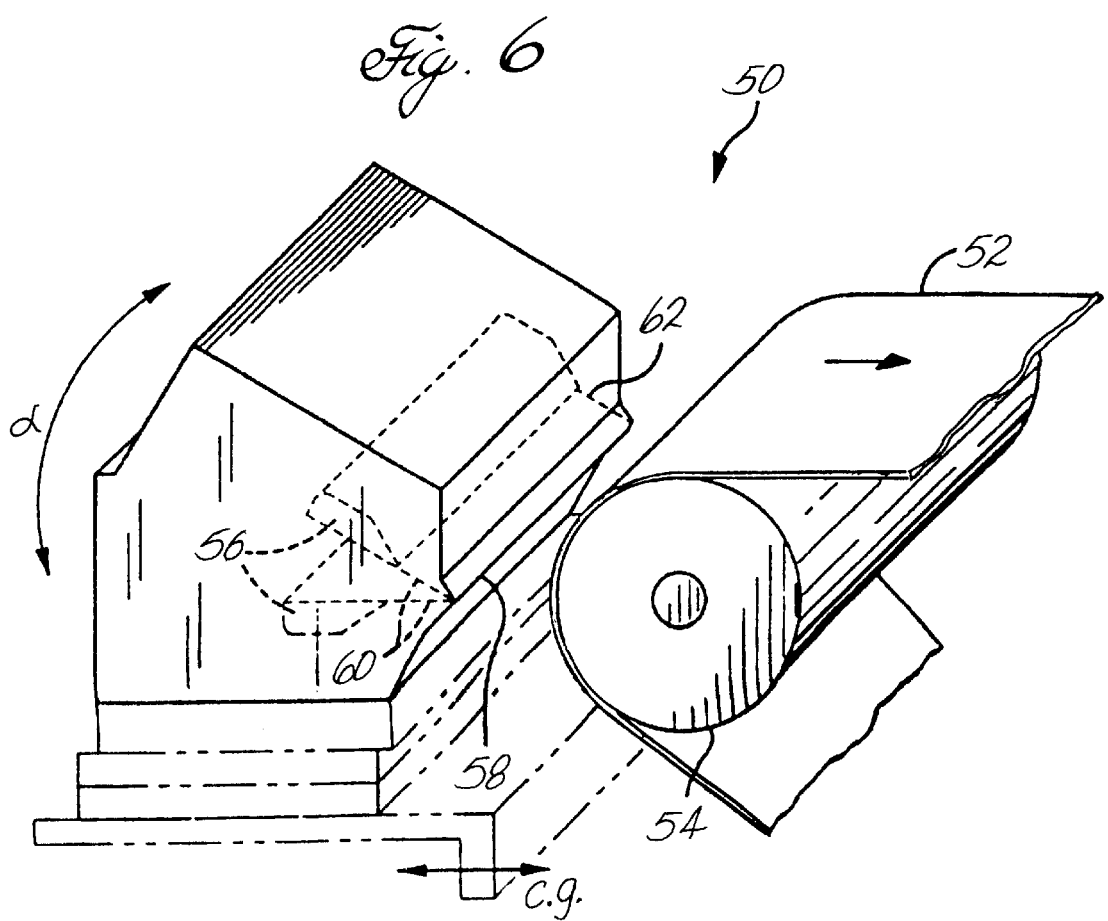
FIG. 6 is a schematic diagram of a dual die useful for applying the adhesive formulations of the present invention.

One preferred method of manufacture uses a multilayer die 50 such as that illustrated in FIG. 6. Although the die shown in FIG. 6 illustrates the application of two coating layers to a substrate 52, it will be understood that the principles of this method are equally applicable to more than two layers. In accordance with standard practice, the substrate, which in this case preferably comprises silicone coated paper, is referred to as a "web" and is formed into a long roll. The web 52 travels around a back-up roll 54 as it passes the distal end of the multilayer die 50. As shown in FIG. 6, both the die 50 and the web 52 have substantially equal width such that the entire width of the web is coated in one pass by the fluid flowing out of the die 50 and onto the web 52. In this case, two separate fluid layers are flowing out of manifolds 56 formed in the die 50 and along individual slots 60, which are defined by the die's distal ends 62. The slots 60 each communicate with the interface between the web 52 and the distal most tips 58 of the die 50. These tips are referred to as the "die lips" 58 and are illustrated and described in more detail in connection with FIG. 7 below.

Figure 8:
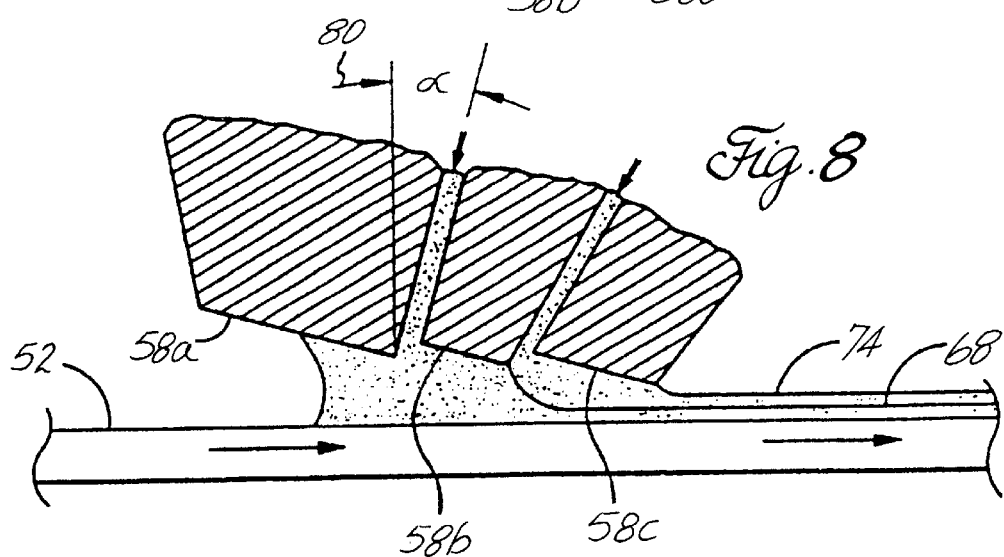
FIG. 8 is a cross-sectional schematic view showing an angled lip structure of the dual die as it is applying two layers of adhesive.

The multilayer die 50 is modular, thus allowing for variations in the individual slots 60 and lip 58 configurations without necessitating modifications to the other slots and lips. Thus, these geometries can be adjusted in order to achieve successful coating. Other variables include the "coating gap" (c.g.) and the "angle of attack" ($\alpha$) of the die. As illustrated in FIG. 6, the coating gap is the distance that the lips 58 are set back from the web. The angle of attack ($\alpha$) is the degree of angular adjustment of the lip surfaces and of the entire die with respect to the outer pointing normal of the web as illustrated in FIG. 8. Another variable is the web speed, which preferably varies between 50 and 1,000 feet per minute, or more.

Either one of two die coating methods may be utilized: interference coating or proximity coating. In the former case, the lips 58 of the die actually are pressed forward in the direction of the web 52, but do not contact the web nor cause any damage thereto, because they hydroplane on a thin layer of coating material. However the pressure may actually cause the back-up roll 54 (typically constructed from a hard rubber material) to deform in order to relieve the pressure of the die against the lips 58. In proximity coating, the lips 58 of the die 50 are positioned a precise distance from the web 52 and are not pressed forward toward the web. The back-up roll 54 is typically constructed from a stainless steel that allows for precision in the circumference of the roll and minimizes roll run-out. The method described herein can be successfully utilized with either type of coating technique.

Figure 7:
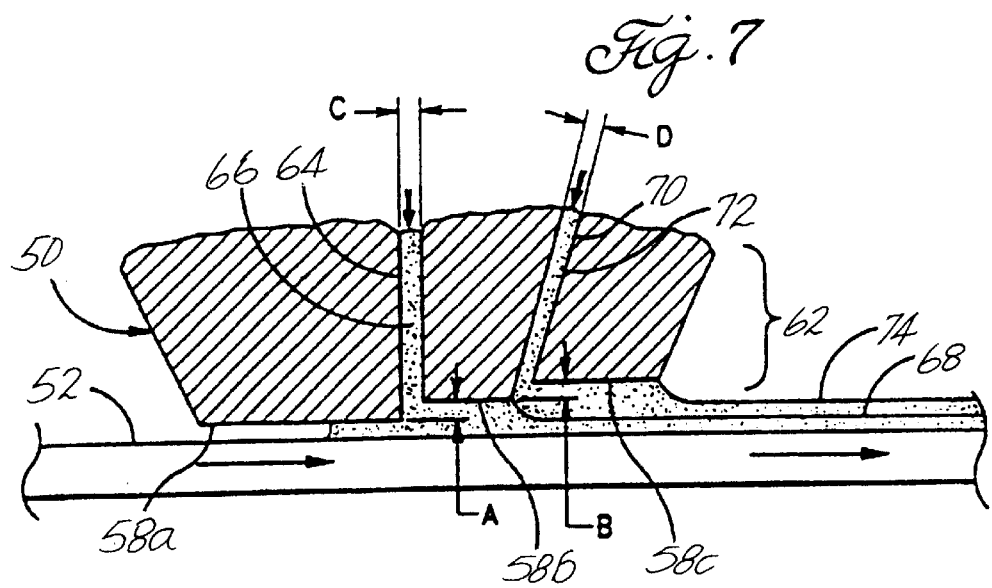
FIG. 7 is a cross-sectional schematic view showing the lip structure of the dual die of FIG. 6 as it is applying two layers of adhesive.

Because very thin layers of high viscosity adhesives are being coated at relatively high web speeds, the process must be carefully controlled. Such control is accomplished with the present multilayer die coating technique, in part due to the geometry and configuration of the die lips 58. FIG. 7 shows a close-up view of the distal most tips 62 of the multilayer die of FIG. 6, including the lips 58 associated with each slot 60, showing the interface or coating gap with respect to the web 52. With respect to FIG. 7, it should be noted that, for ease of illustration, the die 50 is shown rotated 90° from the position shown in FIG. 6. Moreover, the web 52 is shown in a horizontal arrangement, when in actuality, there may be a slight curvature to the web 52 and back-up roll (not shown) at this point; however, the distances involved are so short that a good approximation of the fluid dynamics can be achieved by assuming a horizontal web 52.

For consistent reference, the individual lips 58 of the multilayer die 50 shall be referred to with respect to the direction of travel of the web 52. For example, the lip 58a shown to the left in FIG. 7 will be referred to as the "upstream lip," while the right-most lip 58c shall be referred to as the "downstream lip." Thus, the "middle lip" 58b will have that same reference. Accordingly, the upstream and middle lips 58a, 58b define an upstream feed gap 64 through which an adhesive material 66 flows onto the web 52 to form a bottom adhesive layer 68 of a multilayer adhesive product. Likewise, the middle lip 58b and the downstream lip 58c together form a slotted feed gap 70 through which adhesive 72 flows onto the top of the lower layer 68 as the web travels in left-to-right direction, as illustrated in FIG. 7. This forms a top adhesive layer 74 of the multilayer adhesive product. Again, for ease of illustration, the top layer 74 is shown as a darker-colored material, but this may not necessarily be the case in actual production. For instance, various colors or tags such as ultra-violet fluorescent dye may be utilized to facilitate measurement of individual layer thicknesses.

Coating of viscous adhesives at these web speed rates can involve a number of problems. For example, recirculations in the flow of either the bottom or top adhesive layers can result in certain defects in the final multilayer product. Such recirculations may occur if the separation point of either liquid adhesive with respect to the die lips 58 occurs at an inappropriate location. In addition, an extreme pressure gradient can result in the upstream leakage of liquid out of the coating gap area, again causing defects in the end product due to nonuniform adhesive layer thicknesses, etc. Moreover, these and other defects result in the diffusion of one layer in the other since the layers are being coated simultaneously in the liquid state. Such diffusing jeopardizes the integrity and performance of the resulting product.

Thus, it has been found, with respect to the multilayer die coating described herein, that it is very important to control the pressure gradients of the adhesives under each lip. In particular, the top layer should separate from the middle lip at the downstream corner of the lip. In order to achieve such coating control, the lips 58 of each die section are stepped or spaced away from the web 52 in the downstream direction. This design allows the lips to generate the appropriate pressure gradients and to ensure smooth flow of the adhesive and uniform layer thicknesses. The adjustment of a number of run parameters are necessary in order to achieve this goal. For example, the coating gaps at lip 58b and 58c should be approximately in the range of one to three times the compounded wet film thicknesses of the layers being fed from upstream of said lip. Under the upstream lip 58a, the net flow rate is necessarily zero, and a turn-around flow is the only possibility. Thus, the coating gap under this lip is solely set in order to avoid leakage of the liquid out from the coating gap in the upstream direction. Moreover, the upstream step, defined as dimension A in FIG. 7, and the downstream step, defined as dimension B, may range anywhere from zero to four mils (0.0 inches to 0.004 inches/0 to 100 $\mu$m). The feed gaps (defined as dimensions C and D in FIG. 7) can also be adjusted anywhere between one and fifteen mils (0.001 inches to 0.015 inches/25 μm to 325 μm), preferably not to exceed five times the wet film thickness of their correspondent layers. In addition, the length of the lips 58 in the direction of web travel play an important role in achieving the proper pressure gradient. Thus, the upstream lip 58a should be approximately two millimeters in length, or more, as necessary to seal the head as noted above. The downstream lip 58c and middle lip 58b may fall within the range of 0.1 to 3 mm in length.

It will be recognized that one of ordinary skill in the art can adjust these various parameters in order to achieve the proper fluid dynamics for uniform layer coating. Of course, persons of more than ordinary skill can adjust the die and run parameters more precisely in order to achieve good results. However, such persons are not always readily available in production settings. Therefore, it is advantageous to provide a die geometry that will increase the size of the window of successful multilayer coating operation. This can be achieved by certain adjustments in the orientation of the die lips.

Thus, FIG. 8 illustrates the die 50 of FIG. 7 rotated slightly in the clockwise direction representing an "angle of attack" (α). For consistent reference, the angle of attack (α) shown in FIG. 8 represents a negative angle of attack, or a "converging" orientation of the downstream lip 58c with respect to the web 52. This converging lip orientation provides a negative pressure gradient (in the direction of web travel), along the downstream lip 58c, which is beneficial in preventing a coating defect well known as "ribbing," a pattern of regular striation in the sense of the web travel in the film. The fact that the middle and the upstream lips 58a and 58c also achieve a convergent orientation is not particularly beneficial. Although the angle of attack of the die can be varied widely in order to achieve these advantages, it has been found that angles in the rate of 0° to −5° are appropriate.

Figure 9:
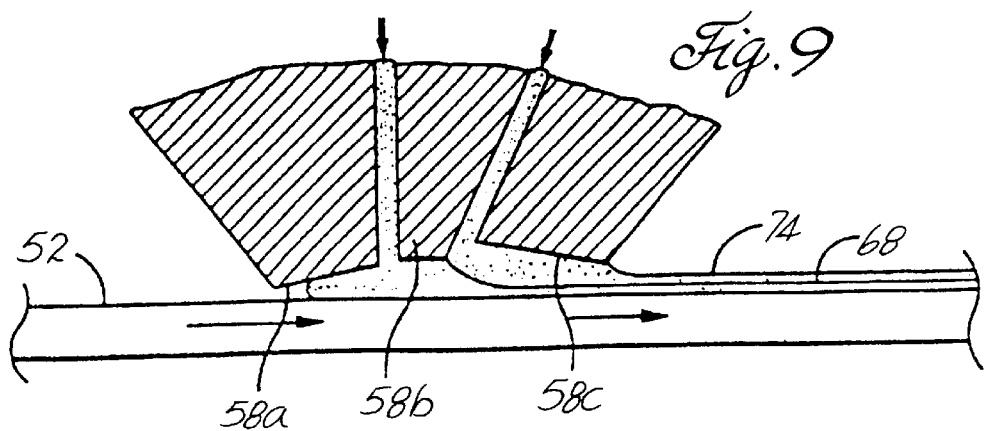
FIG. 9 is a cross-sectional schematic view of a dual die featuring a beveled lip structure.

An even further successful operating window can be achieved with additional lip modifications. FIG. 9 shows a variation of the lip configuration of FIG. 8. In this configuration, the downstream lip 58c is angled or beveled to as to have a converging profile, similar to that shown in FIG. 8. However, the middle lip 58b is positioned so as to be flat or parallel with respect to the web 52. The upstream lip 58a, on the other hand, is beveled so that it is diverging from the web 52 in the downstream direction. This configuration, again, provides the appropriate pressure gradient under the individual lips to avoid recirculations and upstream leakage. Moreover, if perturbations in the coating conditions occur (such as, for example, due to roll run-out, foreign objects on the web, variations in ambient pressure, etc.), the converging configuration of the upstream lip 58a shown in FIG. 9 will produce a dampening effect on flow conditions so that defects in the coating layers do not occur. In this manner, the multilayer coating bead acts as a non-linear spring to dampen out such unwanted events in order to return to steady state. The die 50 can then be adjusted in accordance with standard angle of attack variations to achieve favorable coating conditions. Because the lips 58 are pre-disposed or beveled in a favorable orientation, the adjustment of angle of attack, as well as coating gap, need not be so precise. Thus, persons of ordinary skill or even less skill can successfully achieve good coating results.

Additional description of a method and apparatus for coating a multilayer construction is provided in U.S. Pat. No. 5,728,430, the disclosure of which is incorporated herein by reference.

EXAMPLES

The following nonlimiting Examples 1 to 5 are illustrative of the present invention. Comparative Examples 1 to 9 are presented for comparison. The exemplified constructions were made using the adhesive compositions described below. Test methods used to measure adhesive properties are discussed below. Selected properties of the adhesives and performance characteristics of the PSA constructions are presented in Tables 1 to 5.

For each adhesive composition, the glass transition temperature ($T_g$) is indicated. $T_g$ is the temperature at which the polymer changes from a glassy to a rubbery state. The $T_g$ was taken as the temperature at which the maximum tangent delta occurs in a temperature sweep from −80° C. to 100° C. at a frequency of 10 radians/s generated on an RMS800 rheometer by Rheometric Scientific, Inc. (Piscataway, N.J.).

Adhesive Compositions

In order to prepare a series of multilayer PSA label constructions and controls, the following adhesive Compositions A to G were used:

Composition A

Composition A was an emulsion acrylic adhesive prepared as generally described in Example 2 of U.S. patent application Ser. No. 08/905,073, filed Jul. 31, 1997, the disclosure of which is incorporated herein by reference. The $T_g$ for Composition A was about −4° C.

Composition B

Composition B was an emulsion acrylic adhesive similar to Composition A except that the tackifier (Snowtack 920) was replaced by Snowtack 375A (Eka Nobel, Netherlands). The $T_g$ for Composition B was about −6° C.

Composition C

Composition C was an emulsion acrylic adhesive prepared by combining Composition E, below with (i) 12% Snowtack 301 A (Eka Nobel) and (ii) 6% of an emulsion acrylic polymer as generally described in Example E10 of U.S. Pat. No. 5,536,800, the disclosure of which is incorporated herein by reference. The $T_g$ for Composition C was about −20° C.

Composition D

Composition D was an emulsion acrylic adhesive prepared as generally described in the example of U.S. patent application Ser. No. 08/892,002, filed Mar. 31, 1997, the disclosure of which is incorporated herein by reference. The $T_g$ for Composition D was about −13° C.

Composition E

Composition E was an emulsion acrylic copolymer prepared from a monomer mixture containing (i) about 10 to 20 parts 2-ethylhexyl acrylate (2-EHA), (ii) about 60 to 80 parts butyl acrylate (BA), (iii) about 2 to 10 parts methyl acrylate (MA), (iv) about 2 to 10 parts vinyl acetate (VA), (v) about 1 to 5 parts acrylic acid (AA), and (vi) about 1 to 5 parts methacrylic acid (MAA). The $T_g$ for Composition E was about −21° C.

Composition F

Composition F was an emulsion acrylic adhesive commercially available under the name E2920 from Rohm & Haas (Philadelphia, Pa.). The $T_g$ for Composition F was about −26° C.

Composition G

Composition G was an emulsion acrylic adhesive prepared as generally described in Example 22 of U.S. patent application Ser. No. 08/825,490, filed Mar. 28,1997, the disclosure of which is incorporated herein by reference. The $T_g$ for Composition G was about −17° C.

PSA Label Constructions

Six multilayer PSA label constructions according to the invention were prepared as set forth below. Additionally, eight single layer PSA label constructions were prepared for comparative, purposes, as described below.

Example 1

Example 1 was a multilayer adhesive construction having a total coat weight of 18 g/m². The LSA was Composition A and had a coat weight of 6 g/m². The FSA was Composition D and had a coat weight of 12 g/m². The facestock was 50 lb uncoated, wood-free, sized 2-sides label stock, and the release liner was a solventless silicone-coated, 42# super calendered Kraft release liner.

Example 2

Example 2 was a multilayer adhesive construction having a total coat weight of 18 g/m². The LSA was Composition B and had a coat weight of 6 g/m². The FSA was Composition E and had a coat weight of 12 g/m². The facestock was 50 lb uncoated, wood-free, sized 2-sides label stock, and the release liner was an emulsion silicone-coated machine-finished paper.

Example 3

Example 3 was a multilayer adhesive construction having a total coat weight of 18 g/m². The LSA was Composition C and had a coat weight of 6 g/m². The FSA was Composition D and had a coat weight of 12 g/m². The facestock was 50 lb uncoated, wood-free, sized 2-sides label stock, and the release liner was a solventless silicone-coated, 42# super calendered Kraft release liner.

Example 4

Example 4 was a multilayer adhesive construction having a total coat weight of 20 g/m². The LSA was Composition F and had a coat weight of 10 g/m². The FSA was Composition G and had a coat weight of 10 g/m². The facestock was 50 lb uncoated, wood-free, sized 2-sides label stock, and the release liner was a solventless silicone-coated, 42# super calendered Kraft release liner.

Example 5

Example 5 was a multilayer adhesive construction having a total coat weight of 18 g/m². The LSA was Composition B and had a coat weight of 6 g/im². The FSA was Composition D and had a coat weight of 12 g/m². The facestock was 50 lb uncoated, wood-free, sized 2-sides label stock, and the release liner was a solventless silicone-coated, 42# super calendered Kraft release liner.

Comparative Example 1

Comparative Example 1 was a single adhesive construction having a total coat weight of 18 g/m². The adhesive was Composition A. The facestock was 50 lb uncoated, wood-free, sized 2-sides label stock, and the release liner was a solventless silicone-coated, 42# super calendered Kraft release liner.

Comparative Example 2

Comparative Example 2 was a single adhesive construction having a total coat weight of 18 g/m². The adhesive was Composition B. The facestock was 50 lb uncoated, wood-free, sized 2-sides label stock, and the release liner was an emulsion silicone-coated machine-finished paper.

Comparative Example 3

Comparative Example 3 was a single adhesive construction having a total coat weight of 18 g/m². The adhesive was Composition C. The facestock was 50 lb uncoated, wood-free, sized 2-sides label stock, and the release liner was a solventless silicone-coated, 42# super calendered Kraft release liner.

Comparative Example 4

Comparative Example 4 was a single adhesive construction having a total coat weight of 18 g/m². The adhesive was Composition D. The facestock was 50 lb uncoated, wood-free, sized 2-sides label stock, and the release liner was a solventless silicone-coated, 42# super calendered Kraft release liner.

Comparative Example 5

Comparative Example 5 was a single adhesive construction having a total coat weight of 18 g/m². The adhesive was Composition F. The facestock was 50 lb uncoated, wood-free, sized 2-sides label stock, and the release liner was a solventless silicone-coated, 42# super calendered Kraft release liner.

Comparative Example 6

Comparative Example 6 was a single adhesive construction having a total coat weight of 18 g/m². The adhesive was Composition G. The facestock was 50 lb uncoated, wood-free, sized 2-sides label stock, and the release liner was a solventless silicone-coated, 42# super calendered Kraft release liner.

Comparative Example 7

Comparative Example 7 was a single adhesive construction having a total coat weight of 18 g/m². The adhesive was Composition E. The facestock was 50 lb uncoated, wood-free, sized 2-sides label stock, and the release liner was an emulsion silicone-coated machine-finished paper.

Comparative Example 8

Comparative Example 8 was a single adhesive construction having a total coat weight of 12 g/m². The adhesive was Composition D. The facestock was 50 lb uncoated, wood-free, sized 2-sides label stock, and the release liner was an emulsion silicone-coated machine-finished paper.

Comparative Example 9

Comparative Example 9 was a single adhesive construction having a total coat weight of 6 g/m². The adhesive was Composition B. The facestock was 50 lb uncoated, wood-free, sized 2-sides label stock, and the release liner was an emulsion silicone-coated machine-finished paper.

Test Methods and Results

In separate tests, the adhesives and label constructions described above were evaluated for slittability (adhesive build-up on slitting blades in a roll stock slitter), printer performance (adhesive build-up in a laser printer), adhesive flow, haze and adhesive performance (loop tack and 90° peel), using the following procedures:

Slitting

Figure 2:
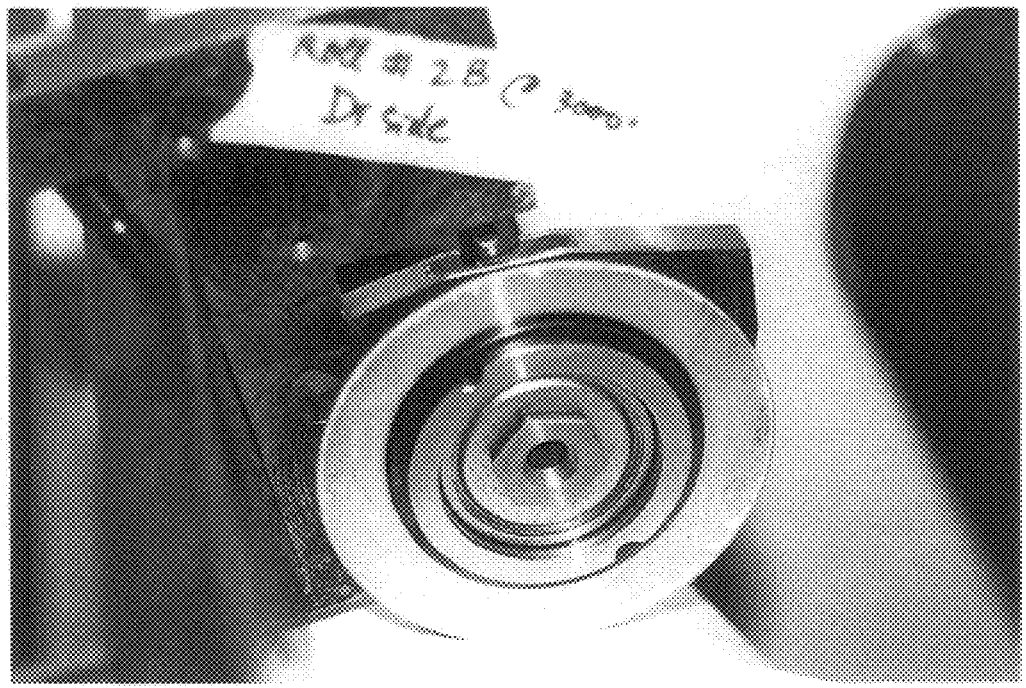
FIG. 2 is a photograph of a slitting knife showing the amount of adhesive build-up of Example 2 on the knife.
Figure 3:
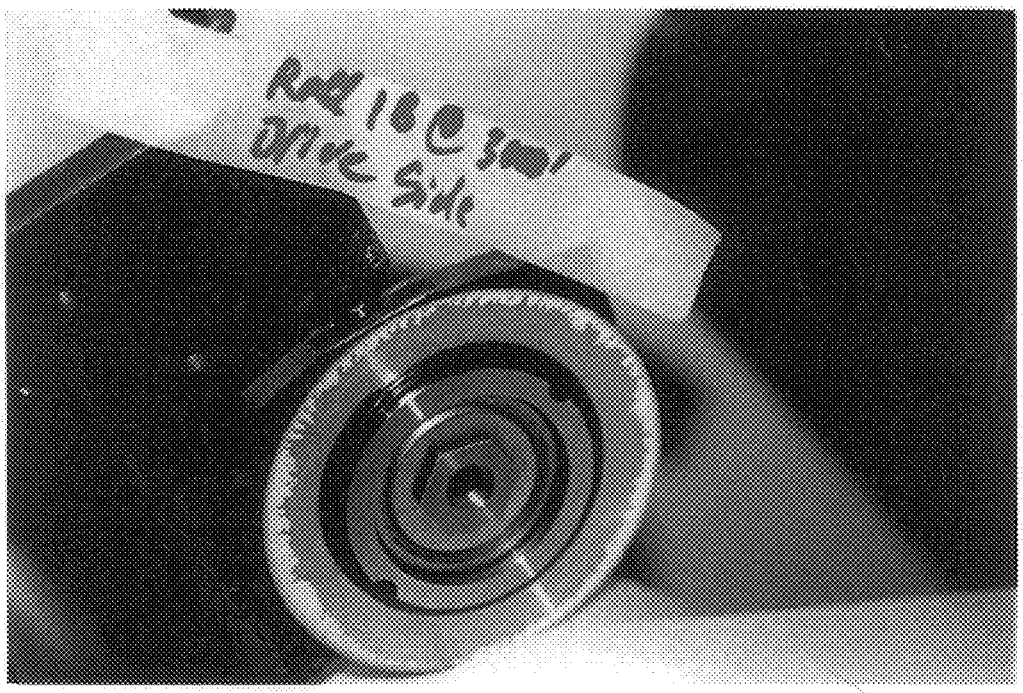
FIG. 3 is a photograph of a slitting knife showing the amount of adhesive build-up of Comparative Example 2 on the knife.

The PSA constructions of Example 2 and Comparative Example 2 were evaluated for slitting performance. Each label construction was prepared as a 24" wide roll, which was slit into smaller 11" wide rolls with three slitting knives. Both examples were slit with the same set of knives. The slitting speed was 300 to 350 ft/min, with the upper and lower rider rolls set at a pressure of 17 psi. After slitting, the slitting knives were visually observed for adhesive contamination. The slitting blades use for constructions of Example 2 and Comparative Example 2 are shown in FIGS. 2 and 3, respectively. After slitting was performed, the adhesive build-up on each of the slitting knives was weighed, and the results are shown in Table 1.

TABLE 1

| | Slitting Performance | |
|---|---|---|
| Example | Weight of Adhesive Build-Up-Knife 1 | Weight of Adhesive Build-Up-Knife 2 |
| Example 2 | 0.0001 g | 0.0007 g |
| Comp. Example 2 | 0.0037 g | 0.0025 g |

As can be seen from FIGS. 2 and 3 and the data in Table 1, the construction of Example 2 caused relatively low adhesive build-up on the slitting knife, while the construction of Comparative Example 2 caused relatively high adhesive build-up on the slitting knife.

Printer Performance

The PSA constructions of several of the exemplified constructions were evaluated for printer performance, i.e., the ability to avoid contaminant build-up in a laser printer. The indicated adhesives were coated onto 24" wide rolls, which were then slit with three slitting knives into 11" rolls. All examples were slit with the same set of knives. After slitting, the rolls were marked with positions 1 to 4, where positions 1 and 3 represent the sides of the roll cut with the tapered side of the slitting knife, and positions 2 and 4 represent the sides of the roll cut with the straight side of the slitting knife. The 11" rolls were sheeted to 8½ wide sheets. The sheets were die-cut with thirty labels (3 columns×10 rows) with two rows of perforations between the columns. The label sheets were fed through a laser printer, with the leading edges being the 1 and 3 edges.

Figure 4:
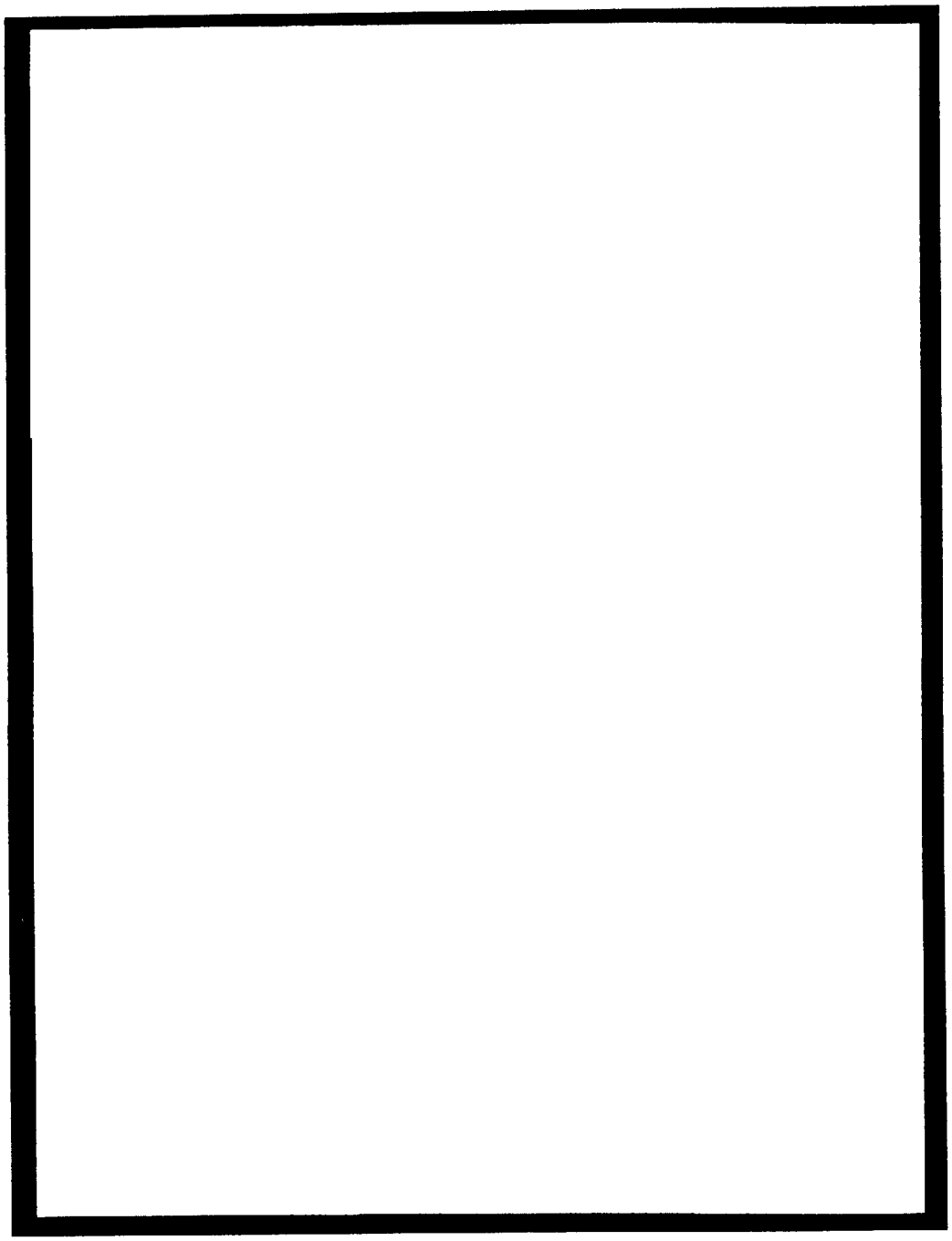
FIG. 4 depicts a reverse (negative) image of a black-out sheet that was used to measure the amount of contaminant build-up in a laser printer caused by passing through the laser printer multiple sheets of a PSA label construction according to Example 1.
Figure 5:
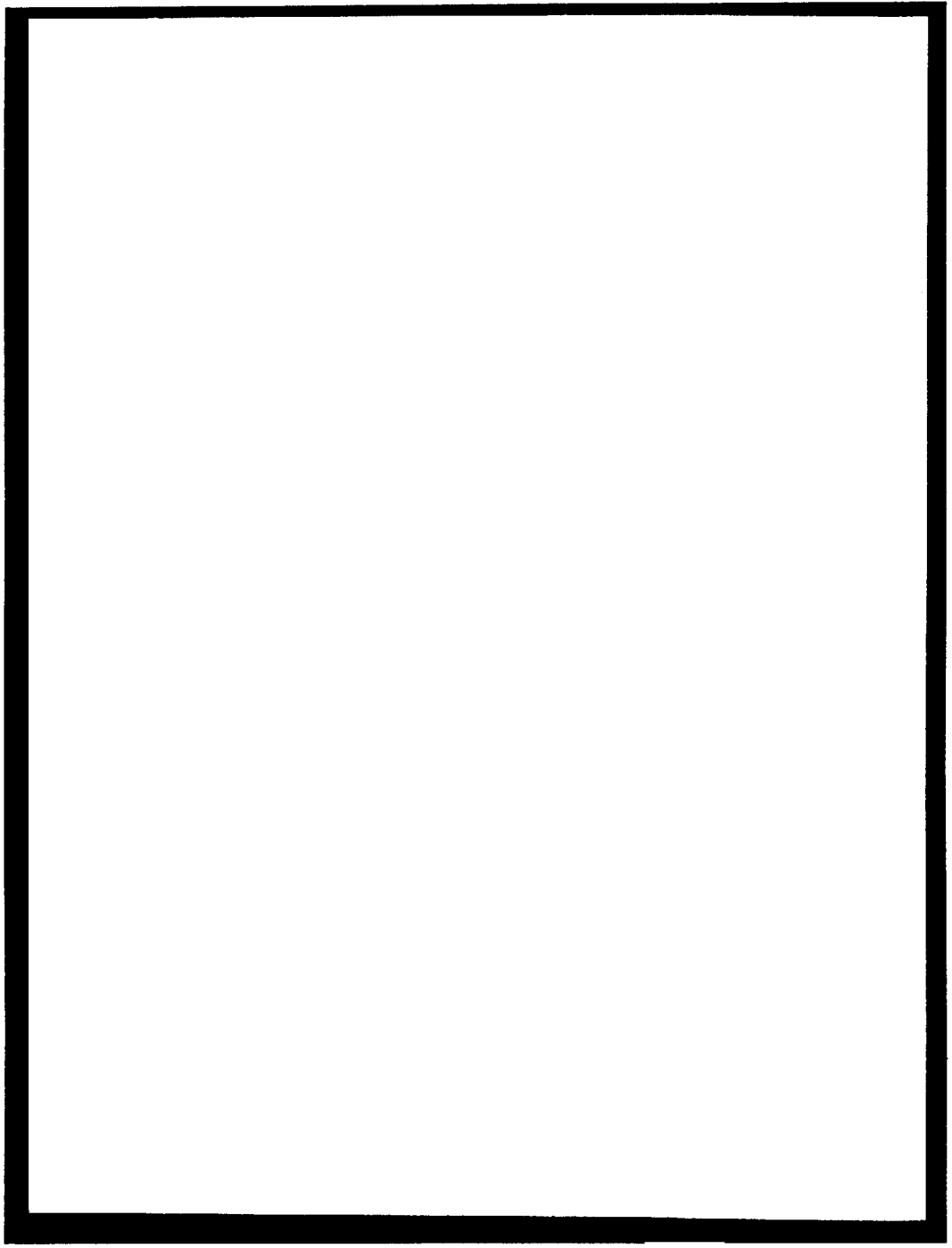
FIG. 5 depicts a reverse (negative) image of a black-out sheet that was used to measure the amount of contaminant build-up in a laser printer caused by passing through the laser printer multiple sheets of a PSA label construction according to Comparative Example 1.

After a specified number of PSA label sheets were passed through a Hewlett Packard Laser Jet IV printer, black-out sheets were prepared by feeding a sheet of white paper through the laser printer and printing the entire sheet black. The residue on the photoreceptor roll prevents toner from adhering to the photoreceptor roll. As a result, the residue-covered area shows up as a white (unprinted) defect on a sheet printed black (black-out sheet). FIGS. 4 and 5 depict negative images of the black-out sheets for Example 1 and Comparative Example 1, respectively, after 2500 label sheets had been passed through the printer. From these black-out sheets it can be seen that the multilayer adhesive construction of the invention caused much lower contaminant build-up in the laser printer than the corresponding single layer construction of the comparative example.

The results were quantified by measuring the total defect area of each black-out sheet. Each black-out sheet was scanned using a Hewlett Packard ScanJet IIc scanner at 200 dpi resolution in black and white photo mode. The images were scanned using Hewlett Packard DeskScan II Version 2.3.1 software, with the brightness and contrast for each image set to their midpoint values. The resulting digital images were analyzed using Image-Pro Plus Version 3.0 image analysis software from Media Cybernetics. An area free of artifacts in each digital image representing the active area of the photoreceptive roll (approximately 200×95 mm$^2$) was selected, and the background was flattened to enhance the contrast of the defects. The intensity threshold value for identifying defects was fixed for each image, and all defects were counted and their area values summed. The summed area values were then normalized to a "standard" photoreceptor roll area of 19,000 mm$^2$. The results are shown in Table 2.

TABLE 2

| | Printer Performance | |
|---|---|---|
| Example | Number of Sheets | Total Defect Area |
| Example 1 | 2500 | 6 mm$^2$ |
| Example 2* | 7339 | 2 mm$^2$ |
| Example 3 | 2500 | 10 mm$^2$ |
| Example 5 | 3000 | 25 mm$^2$ |
| Comp. Example 1 | 2500 | 100 mm$^2$ |
| Comp. Example 2* | 8000 | 14 mm$^2$ |
| Comp. Example 2 | 2500 | 410 mm$^2$ |
| Comp. Example 3 | 2500 | 54 mm$^2$ |

*Label sheets were matrix-stripped prior to being fed through the laser printer.

As can be seen from FIGS. 4 to 9 and the data in Table 2, the amount of printer residue resulting from the inventive multilayer compositions was substantially lower than the amount of printer residue resulting from the corresponding single layer compositions that each contained one of the two adhesives of the corresponding multilayer composition.

Matrix-Stripping

The multilayer PSA construction of Example 2 and the single layer PSA construction of Comparative Example 2 were converted through an Arsoma press utilizing a die. After the die cutting operation, the matrix surrounding the labels was peeled away to leave rows of labels adhered to the release liner. After over 7000 sheets, build-up on the die was observed. The multilayer construction of Example 2 cause low build-up, and the single layer construction of Comparative Example 2 caused high build-up.

Room Temperature Loop Tack

Loop tack measurements were made for strips that were about 25 mm (1 inch) wide using stainless steel as the substrate at a draw rate of about 305 mm/min (12 in/min), according to standard test 1994 Tag and Label Manufacturers Institute, Inc. (TLMI) Loop Tack Test L-1B2, using an Instron Universal Testor Model 4501 from Instron (Canton, Mass.). Loop tack values were taken to be the highest measured adhesion value observed during the test. The results, reported in N/m, are set out in Table 3, where the substrate (HDPE—high density polyethylene; RCB—recycled cardboard) was as indicated.

5° Loop Tack

Loop tack measurements were made for strips that were about 25 mm (1 inch) wide using stainless steel as the substrate. The samples were put in a chamber at 5° C., and the samples were left in the chamber for approximately 2.5 minutes. Loop tack measurements were taken using an Instron Universal Testor Model 4501 from Instron (Canton, Mass.), which was lowered at a rate of about 300 mm/min and taken up at a draw rate of about 50 mm/min. Loop tack values were take to be the highest measured adhesion value observed during the test. The results, reported in N/25 m, are set out in Table 3, where the substrate was HDPE (high density polyethylene). All tests were conducted in triplicate.

Figure 10:
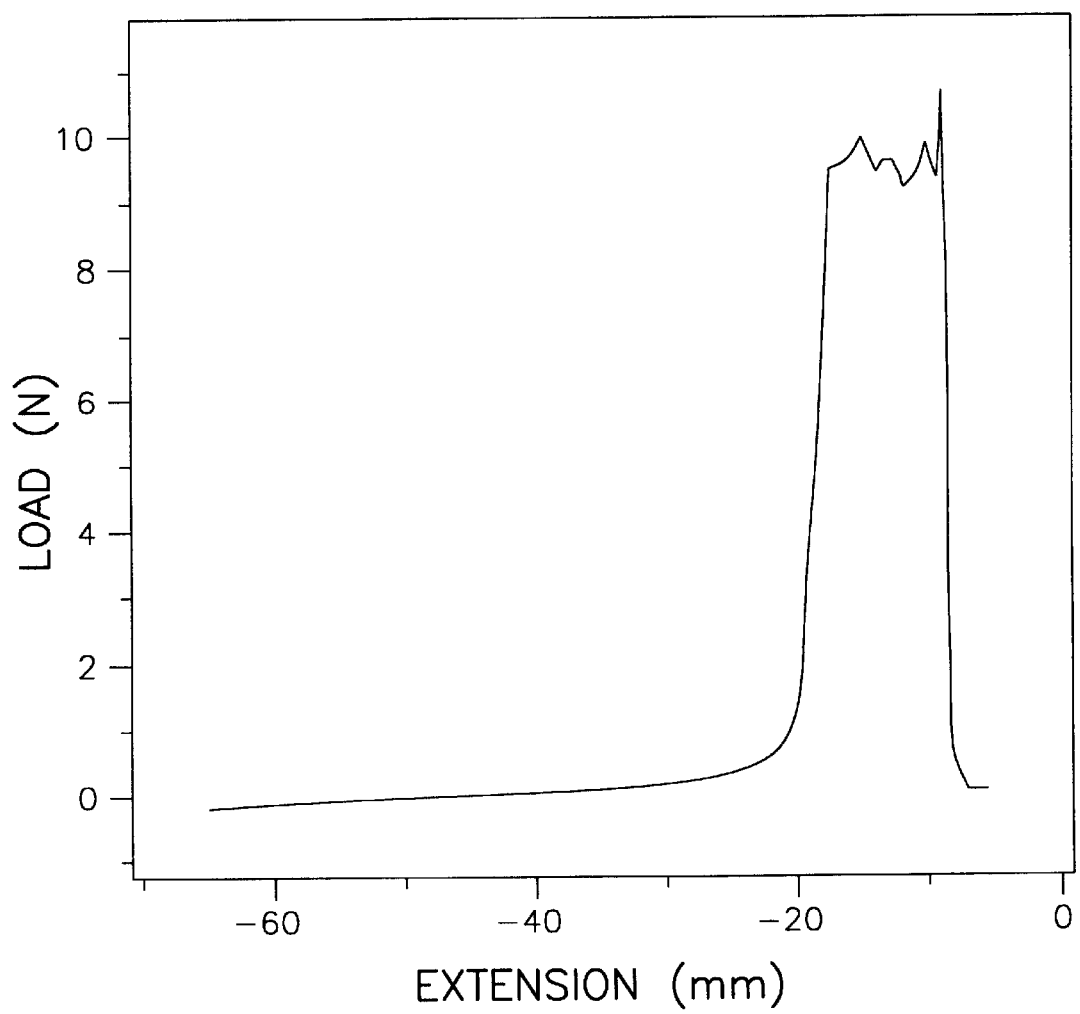
FIG. 10 is a graph showing load versus extension of an adhesive that exhibited a flow peel failure.
Figure 11:
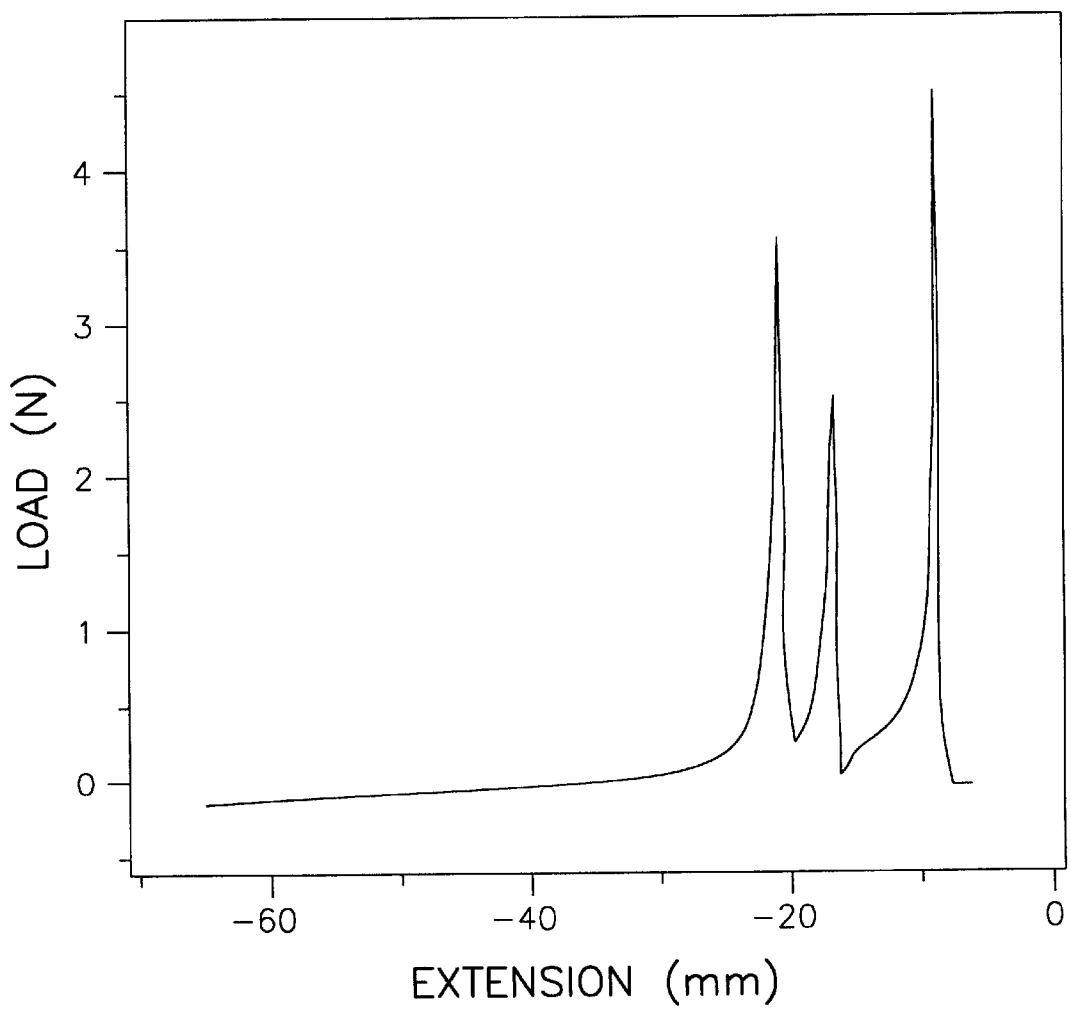
FIG. 11 is a graph showing load versus extension of an adhesive that exhibited a zippy failure.

When a loop tack test is conducted, two different failure modes can occur. One failure mode is the flow peel mode, which generally involves the adhesive being stretched and smoothly pulled from the substrate. An example of a graph showing load versus extension of an adhesive that exhibited a flow peel failure is shown in FIG. 10. The other failure mode is zippy mode whereby the adhesive is pulled quickly in a jerk-like fashion from the substrate, which is commonly observed with label products with low flow characteristics. An example of a graph showing load versus extension of an adhesive that exhibited a zippy failure is shown in FIG. 11. Preferably the multilayer adhesive constructions of the present invention result in a flow peel failure rather than a zippy failure. The failure mode is indicated for those adhesives where it was noted.

90° Adhesion

The indicated adhesive constructions were prepared as described above. The substrates used included high density polyethylene (HDPE) and recycled cardboard (RCB). The resulting construction was die-cut into strips each having an approximate size of 25×204 mm (1×8 in). The strips were centered along the lengthwise direction and applied to 50 152 mm (2×6 in) brightly annealed, highly polished stainless steel test panels that had been washed with diacetone alcohol. The strips were rolled down using a 2 kg (4.5 lb) 5.45 pli 65 shore "A" rubber-faced roller, rolling back and forth once, at a rate of 30 cm/min (12 in/min). The samples were conditioned for 24 hours in a controlled environment testing room maintained at 21° C. (70° F.) and 50% relative humidity. After conditioning, the test strips were peeled away from the test panel in an Instron Universal Tester according to a modified version of the standard tape method Pressure-Sensitive Tape Council, PSTC-1 (rev. 1992), Peel Adhesion for Single Coated Tapes 180° Angle, where the peel angle was 90°, i.e., perpendicular to the surface of the panel, at a rate of 30 cm/min (12 in/min). A load cell linked to a computer was used to estimate the values reported in Table 3. The force to remove the adhesive test strip from the test panel was measured in N/25 mm. All tests were conducted in triplicate.

TABLE 3

| | Adhesive Performance | | | | |
|---|---|---|---|---|---|
| Example | RT Loop Tack RCB (N/25 mm) | RT Loop Tack HDPE (N/25 mm) | 5° C. Loop Tack HDPE (N/25 mm) | 90° Peel RCB (N/25 mm) | 90° Peel HDPE (N/25 mm) |
| Ex. 1 | 6.1 | 10.3 | 4.6 | — | — |
| Ex. 2 | 5.0 | 8.4 | 10.9 (Flow Peel Failure) | 3.7 | 5.4 |
| Ex. 3 | 4.6 | 6.1 | 3.6 | — | — |
| Ex. 4 | — | — | 4.2 | — | 30 |
| Ex. 5 | 6.7 | 9.3 | 8.1 (Flow Peel Failure) | 3.5 | 5.4 |
| Comp. Ex. 1 | 7.0 | 11.9 | 3.9 | — | — |
| Comp. Ex. 2 | 9.2 | 9.8 | 13.3 | 4.8 | 7.8 |
| Comp. Ex. 3 | 6.4 | 7.0 | 5.6 | — | — |
| Comp. Ex. 4 | 5.0 | 5.8 | 4.2 | — | — |
| Comp. Ex. 5 | — | — | 2.7 | — | 31.8 |
| Comp. Ex. 6 | — | — | 2.1 | — | 19.5 |
| Comp. Ex. 8 | — | — | 1.2 | — | — |
| Comp. Ex. 9 | — | — | 0.2 | — | — |

As can be seen from Table 3, the multilayer constructions of the invention exhibited relatively high adhesive performance properties. For example, the adhesive construction of Example 1 exhibited loop tack values similar to the corresponding high performance single layer construction of Comparative Example 1. Similarly, the constructions of Examples 2 and 5 exhibited loop tack values similar to the corresponding high performance single layer construction of Comparative Example 2. Additionally, the constructions of Comparative Examples 8 and 9, which contained the same adhesive compositions as Comparative Examples 2 and 5, respectively, but in lower coat weights, showed considerably worse adhesive performance compared to their higher coat weight counterparts.

Adhesive Flow

Adhesive flow was measured by first providing a single or multilayer adhesive as described above, removing the release liner, and replacing the release liner with a second sheet of facestock identical to the first. Two such constructions were placed between metal plates to form a sandwich as described in Viscoelastic Properties of Polymers, Ch. 6, J. D. Ferry, J. Wiley & Sons, New York, N.Y. (1961). The metal plates were heated to 25° C. to simulate the temperature of the inside of a laser printer near the photoreceptor roll. A 1000 g load was applied to the middle plate for 3 minutes so that the adhesive could flow between the paper facestocks while the top and bottom plates were held stationary. The distance that the weighted metal plate moved relative to the stationary plates was measured by a differential transformer. The maximum displacement was recorded, and is shown in Table 4 below.

TABLE 4

Adhesive Flow

| Example | Flow |
| --- | --- |
| Example 1 | 26 μm |
| Example 2 | 37 μm |
| Example 3 | 18 μm |
| Example 4 | 40 μm |
| Example 5 | 28 μm |
| Comp. Example 1 | 39 μm |
| Comp. Example 2 | 68 μm |
| Comp. Example 3 | 31 μm |
| Comp. Example 4 | 14 μm |
| Comp. Example 5 | 53 μm |
| Comp. Example 6 | 18 μm |
| Comp. Example 7 | 29 μm |
| Comp. Example 8 | 11 μm |
| Comp. Example 9 | 12 μm |

The data in Table 4 demonstrates that the multilayer constructions of the invention exhibited relatively low adhesive flow adhesive compared to their single layer counterparts. For example, the adhesive construction of Example 1 exhibited considerably lower adhesive flow than the corresponding high performance single layer construction of Comparative Example 1. Similarly, the constructions of Examples 2 and 5 exhibited considerably lower adhesive flow than the corresponding high performance single layer construction of Comparative Example 2, and the construction of Example 3 exhibited considerably lower adhesive flow than the corresponding high performance single layer construction of Comparative Example 3.

In particular, it is noted that using a lower coat weight to reduce adhesive flow, as in Comparative Examples 8 and 9, has a significant adverse effect on adhesive performance. The adhesive construction of inventive Example 5 had a total coat weight of 18 g/m$^2$, and comprised Composition B as the LSA at a coat weight of 6 g/m$^2$ and Composition D as the FSA at a coat weight of 12 g/m$^2$. A construction comprising Composition B alone at the same coat weight (Comp. Ex. 2), while exhibiting somewhat better adhesive performance, showed considerably higher adhesive flow. A construction comprising Composition B alone at the coat weight used in the construction of Example 5 (6 g/m$^2$; Comp. Ex. 9) exhibited a low flow value but very poor adhesive performance.

Thus, the above-described testing demonstrates that the inventive multilayer constructions exhibit the desired balance of properties. Specifically, they exhibit better slittability and printer performance than their single layer counterparts. They also exhibit comparable adhesive performance, particularly low temperature and room temperature loop tack, when compared to their corresponding single layer high performance adhesive constructions. Moreover, it can be seen that the adhesive coatings of the multilayer constructions that exhibit good convertibility and printer performance exhibit relatively low adhesive flow values.

Haze

Haze measurements were made according to ASTM D1003 using a HAZEGUARD PLUS 425 BYK Gardner haze meter. For each test, 20 g/m$^2$ of adhesive were coated on a 2 mil thick polyethylene film. The coated laminates were adhered to a stained microscope glass slide and rolled down using a 2 kg (4.5 lb) 5.45 pli 65 shore "A" rubber-faced roller, rolling back and forth once, at a rate of 30 cm/min (12 in/min), then dried in an oven to less than 2% water content. The haze of the total construction was measured as a function of time and is shown below in Table 5.

TABLE 5

Haze

| Example | Haze |
| --- | --- |
| Example 4 | 41% |
| Comp. Example 5 | 36% |
| Comp. Example 6 | 79% |

The data in Table 5 demonstrates that the multilayer construction of Example 4 exhibits a significantly lower haze value compared to the corresponding single layer high performance adhesive construction of Comparative Example 6.

The invention has been described and illustrated by exemplary and preferred embodiments, but is not limited thereto. Persons skilled in the art will appreciate that a variety of modifications can be made without departing from the scope of the invention, which is limited only by the claims. Throughout the text and the claims, use of the word "about" in relation to a range of numbers is intended to modify both the low and the high values stated.

What is claimed is:

1. A method for minimizing contaminant build-up in a printer caused by extended printing of adhesive labels, comprising:
    repeatedly passing through the printer a PSA label comprising:
    (a) a paper or film facestock having an inner surface and an outer surface;
    (b) an adhesive coating of (i) an FSA layer comprising a first emulsion acrylic PSA in contact with the inner surface of the facestock, and (ii) an LSA layer comprising a second emulsion acrylic PSA, different from the first acrylic PSA, in contact with the FSA; and
    (c) a release liner.

2. A method according to claim 1, wherein the adhesive coating has a coat weight of about 17 to 19 g/m$^2$.

3. A method according to claim 1, wherein the FSA layer is at least twice as thick as the LSA layer.

4. A method according to claim 1, wherein the PSA label exhibits a loop tack value of at least about 4.0 N/25 mm at 5° C. on a polyethylene substrate.

5. A method according to claim 1, wherein the PSA label exhibits a loop tack value of at least about 6.0 N/25 mm at 5° C. on a polyethylene substrate.

6. A method according to claim 1, wherein the adhesive coating has a haze value of less than about 60% at room temperature.

7. A method according to claim 1, wherein the adhesive coating has a haze value of less than about 45% at room temperature.

8. A method according to claim 1, wherein the facestock is a clear film facestock.

9. A method according to claim 1, further comprising the step of matrix-stripping the PSA label prior to passing it through the printer.

10. A method according to claim 1, wherein the adhesive coating has a coat weight of less than about 26 g/m$^2$.

11. A method according to claim 1, wherein the thickness of the FSA layer is greater than or equal to the thickness of the LSA layer.

12. A method according to claim 1, where in the FSA layer has a coat weight of about 10 to 14 g/m$^2$, and the LSA layer has a coat weight of about 5 to 7 g/m$^2$.

13. A method according to claim 1, wherein the adhesive coating has a flow of less than about 50 μm at room temperature.

14. A method according to claim 1, wherein the adhesive coating has a flow of less than about 45 μm at room temperature.

15. A method according to claim 1, wherein the adhesive coating has a flow of less than out 40 μm at room temperature.

16. A method according to claim 1, wherein the PSA label exhibits a loop tack value of at least about 3.5 N/25 mm at 5° C. on a polyethylene substrate.

17. A method for minimizing contaminant build-up in a printer caused by extended printing of adhesive labels, comprising:
    passing through the printer at least one PSA label, each PSA label comprising:
    (a) a paper or film facestock having an inner surface and an outer surface;
    (b) an adhesive coating of (i) an FSA layer comprising a first emulsion acrylic PSA in contact with the inner surface of the facestock, and (ii) an LSA layer comprising a second emulsion acrylic PSA, different from the first acrylic PSA, in contact with the FSA; and
    (c) a release liner.

18. A method according to claim 17, wherein the adhesive coating has a coat weight of about 17 to 19 g/m².

19. A method according to claim 17, wherein the FSA layer is at least twice as thick as the LSA layer.

20. A method according to claim 17, wherein the PSA label exhibits a loop tack value of at least about 4.0 N/25 mm at 5° C. on a polyethylene substrate.

21. A method according to claim 17, wherein the PSA label exhibits a loop tack value of at least about 6.0 N/25 mm at 5° C. on a polyethylene substrate.

22. A method according to claim 17, wherein the adhesive coating has a haze value of less than about 60% at room temperature.

23. A method according to claim 17, wherein the adhesive coating has a haze value of less than about 45% at room temperature.

24. A method according to claim 17, wherein the facestock is a clear film facestock.

25. A method according to claim 17, further comprising the step of matrix-stripping the PSA label prior to passing it through the printer.

26. A method according to claim 17, wherein the adhesive coating has a coat weight of less than about 26 g/m².

27. A method according to claim 17, wherein the thickness of the FSA layer is greater than or equal to the thickness of the LSA layer.

28. A method according to claim 17, wherein the FSA layer has a coat weight of about 10 to 14 g/m², and the LSA layer has a coat weight of about 5 to 7 g/m².

29. A method according to claim 17, wherein the adhesive coating has a flow of less than about 50 μm at room temperature.

30. A method according to claim 17, wherein the adhesive coating has a flow of less than about 40 μm at room temperature.

31. A method according to claim 17, wherein the PSA label exhibits a loop tack value of at least about 3.5 N/25 mm at 5° C. on a polyethylene substrate.

32. A method for minimizing contaminant build-up in a printer caused by extended printing of adhesive labels, comprising:
    passing through the printer at least one PSA label, each PSA label comprising:
    (a) a paper or film facestock having an inner surface and an outer surface;
    (b) an adhesive coating of (i) an FSA layer comprising a first emulsion acrylic PSA in contact with the inner surface of the facestock, and (ii) an LSA layer comprising a second emulsion acrylic PSA, different from the first acrylic PSA, in contact with the FSA; and
    (c) a release liner; and
    matrix-stripping the PSA label prior to passing it through the printer.

33. A method according to claim 32, wherein the adhesive coating has a coat weight of about 17 to 19 g/m².

34. A method according to claim 32, wherein the FSA layer is at least twice as thick as the LSA layer.

35. A method according to claim 32, wherein the PSA label exhibits a loop tack value of at least about 4.0 N/25 mm at 5° C. on a polyethylene substrate.

36. A method according to claim 32, wherein the PSA label exhibits a loop tack value of at least about 6.0 N/25 mm at 5° C. on a polyethylene substrate.

37. A method according to claim 32, wherein the adhesive coating has a haze value of less than about 60% at room temperature.

38. A method according to claim 32, wherein the adhesive coating has a haze value of less than about 45% at room temperature.

39. A method according to claim 32, wherein the facestock is a clear film facestock.

40. A method according to claim 32, wherein the adhesive coating has a coat weight of less than about 26 g/m².

41. A method according to claim 32, wherein the thickness of the FSA layer is greater than or equal to the thickness of the LSA layer.

42. A method according to claim 32, wherein the FSA layer has a coat weight of about 10 to 14 g/m², and the LSA layer has a coat weight of about 5 to 7 g/m².

43. A method according to claim 32, wherein the adhesive coating has a flow of less than about 50 μm at room temperature.

44. A method according to claim 32, wherein the adhesive coating has a flow of less than about 40 μm at room temperature.

45. (New) A method according to claim 32, wherein the PSA label exhibits a loop tack value of at least about 3.5 N/25 mm at 5° C. on a polyethylene substrate.

* * * * *

UNITED STATES PATENT AND TRADEMARK OFFICE
CERTIFICATE OF CORRECTION

PATENT NO. : 6,547,887 B1  
DATED : April 15, 2003  
INVENTOR(S) : Ko et al.

Page 1 of 1

It is certified that error appears in the above-identified patent and that said Letters Patent is hereby corrected as shown below:

Column 20,  
Line 65, change "where in" to -- wherein --

Signed and Sealed this

Ninth Day of November, 2004

JON W. DUDAS  
*Director of the United States Patent and Trademark Office*